United States Patent [19]

Haginoya et al.

[11] Patent Number: 4,933,802
[45] Date of Patent: Jun. 12, 1990

[54] GAS INSULATED SWITCHGEAR SYSTEM HAVING SINGLE PHASE RESERVE BUS

[75] Inventors: Mitsugu Haginoya; Tohru Tsubaki, both of Hitachi; Shigeru Fujiya, Hitachioota; Haruo Honda, Hitachi, all of Japan

[73] Assignee: Hitachi, Ltd., Tokyo, Japan

[21] Appl. No.: 375,877

[22] Filed: Jul. 6, 1989

[51] Int. Cl.⁵ .............................................. H02H 2/08
[52] U.S. Cl. ........................................ 361/48; 361/63; 361/67; 307/64; 307/113; 307/115
[58] Field of Search ................ 361/42, 47, 48, 49, 361/50, 62, 63, 67, 70; 307/64, 112, 113, 115

[56] References Cited

U.S. PATENT DOCUMENTS

| | | | |
|---|---|---|---|
| 3,714,452 | 1/1973 | Williamson | 361/67 X |
| 4,042,968 | 8/1977 | Kyprcos et al. | 361/67 X |
| 4,562,359 | 12/1985 | Herzig | 307/115 X |

FOREIGN PATENT DOCUMENTS 56-139014 of 1981 Japan .
58-3505 of 1983 Japan .

Primary Examiner—Derek S. Jennings
Attorney, Agent, or Firm—Antonelli, Terry, Stout & Kraus

[57] ABSTRACT

A gas insulated switchgear system having two gas insulated switchgear equipments, each of which consists of first disconnecting switches, circuit breakers, and second disconnecting switches, three phase gas insulated buses which are respectively connected to the first disconnecting switches of the two gas insulated switchgear equipments in every three phases thereof, a single phase reserve buses which are commonly connected to all of the second disconnecting switches of the two gas insulated switchgear equipments, and an operating device for opening the circuit breakers and the first disconnecting switches in only one phase of the gas insulated switchgear equipments and closing the second disconnecting switch in only the one phase. A gas insulated switchgear system having single phase reserve bus is economical and switches one of the three phase main buses to the single reserve bus without forming short circuit.

5 Claims, 3 Drawing Sheets

GAS INSULATED SWITCHGEAR SYSTEM HAVING SINGLE PHASE RESERVE BUS

BACKGROUND OF THE INVENTION

The present invention relates to a gas insulated switchgear system having a single phase reserve bus and more particularly to a system for switching circuit breakers and disconnecting switches so as to feed electric current from one of the three phase main buses to the single phase reserve bus when the one of the three phase main buses is grounded.

In the general gas insulated switchgear system, the Japanese Patents Laid-open Nos. 56-139014/1981 and 58-3505/1983 are cited as examples of such system.

In the Japanese Patents Laid-open No. 56-139014/1981, a gas insulated switchgear system which does not have any reserve bus is shown. So, in this gas insulated switchgear system, there is a problem if one of the three phase main bus is grounded, electric current which flows in all of the three phase main bus breaks down.

In the Japanese Patent Laid-open No. 58-3505/1983, a gas insulated switchgear system which has three phase main buses and three phase reserve buses having feeding bus in each phase is shown, and if on of the three phase main buses is grounded, all of the three phase main buses are switched to the three phase reserve buses. But the three phase reserve buses usually using gas insulated type are very big and expensive.

SUMMARY OF THE INVENTION

The present invention has been accomplished to overcome the abovementioned problem of the conventional technique.

An object of present invention is to provide a gas insulated switchgear system having a single phase reserve bus which is not expensive and switches one of the three phase main buses to the single phase reserve bus when the one of the three phase man buses is grounded.

Another object of the present invention is to provide a gas insulated switchgear system having a single phase reserve bus which is constructed so as to avoid forming short-circuit of the three phase electric current which flows in the three phase main buses when one of the three phase main buses is switched to the single phase reserve bus.

DETAILED DESCRIPTION OF THE PREFERRED EMBODIMENTS

Figure 1:
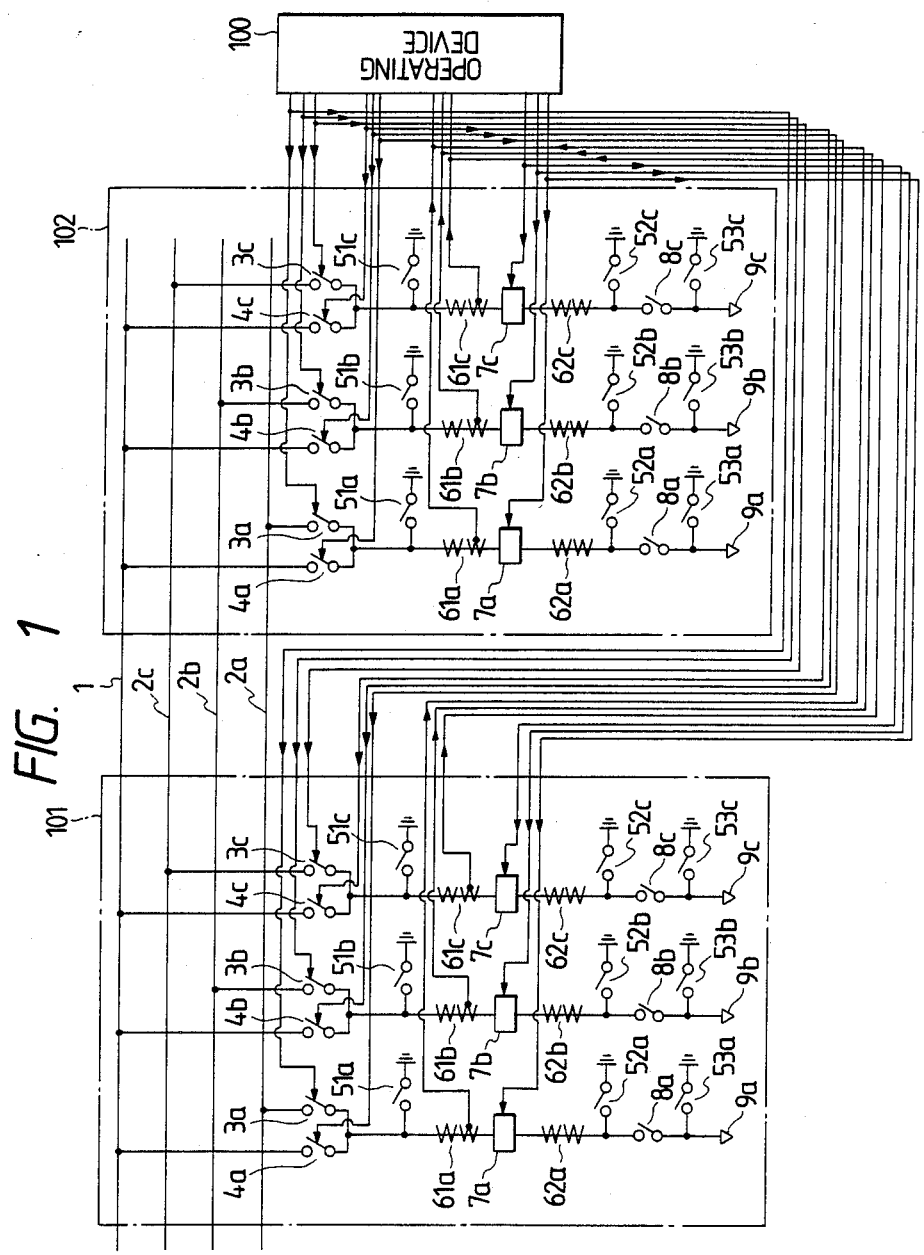
FIG. 1 is a diagrammatic view of the gas insulated switchgear system in the present invention.

FIG. 1 shows an embodiment of the present invention having at least two sets of the gas insulated switchgear equipment 101, 102 and an operating device 100 thereof. In FIG. 1, the construction of the gas insulated switchgear equipments 101, 102 are the same each other and three phase main buses 2a, 2b, 2c thereof are commonly connected, but cable heads 9a, 9b, 9c thereof are connected to different electric power systems.

Numeral 1 is a single phase reserve bus which is connected to one side of disconnecting switches 4a, 4b, 4c. Three phase main buses 2a, 2b, 2c are respectively connected to one side of disconnecting switches 3a, 3b, 3c. Other side of the disconnecting switches 4a, 4b, 4c are respectively connected to other side of the disconnecting switches 3a, 3b, 3c. The other side of the disconnecting switches 4a, 4b, 4c and the other side of the disconnecting switches 3a, 3b, 3c are respectively and commonly connected to the cable heads 9a, 9b, 9c respectively through circuit breakers 7a, 7b, 7c and disconnecting switches 8a, 8b, 8c. Current transformers 61a, 61b, 61c are respectively disposed between the other sides of the disconnecting switches 3a, 3b, 3c and the circuit breakers 7a, 7b, 7c, and detect grounding currents of the respective three phase main buses 2a, 2b, 2c. Current transformers 62a, 62b, 62c are respectively disposed between the disconnecting switches 8a, 8b, 8c and the circuit breakers 7a, 7b, 7c. Grounding devices 51a, 51b, 51c are respectively connected to the other sides of the disconnecting switches 3a, 3b, 3c, and grounding devices 52a, 53a, 52b, 53b, 52c, 53c are respectively connected to the both sides of the disconnecting switches 8a, 8b, 8c.

Figure 2:
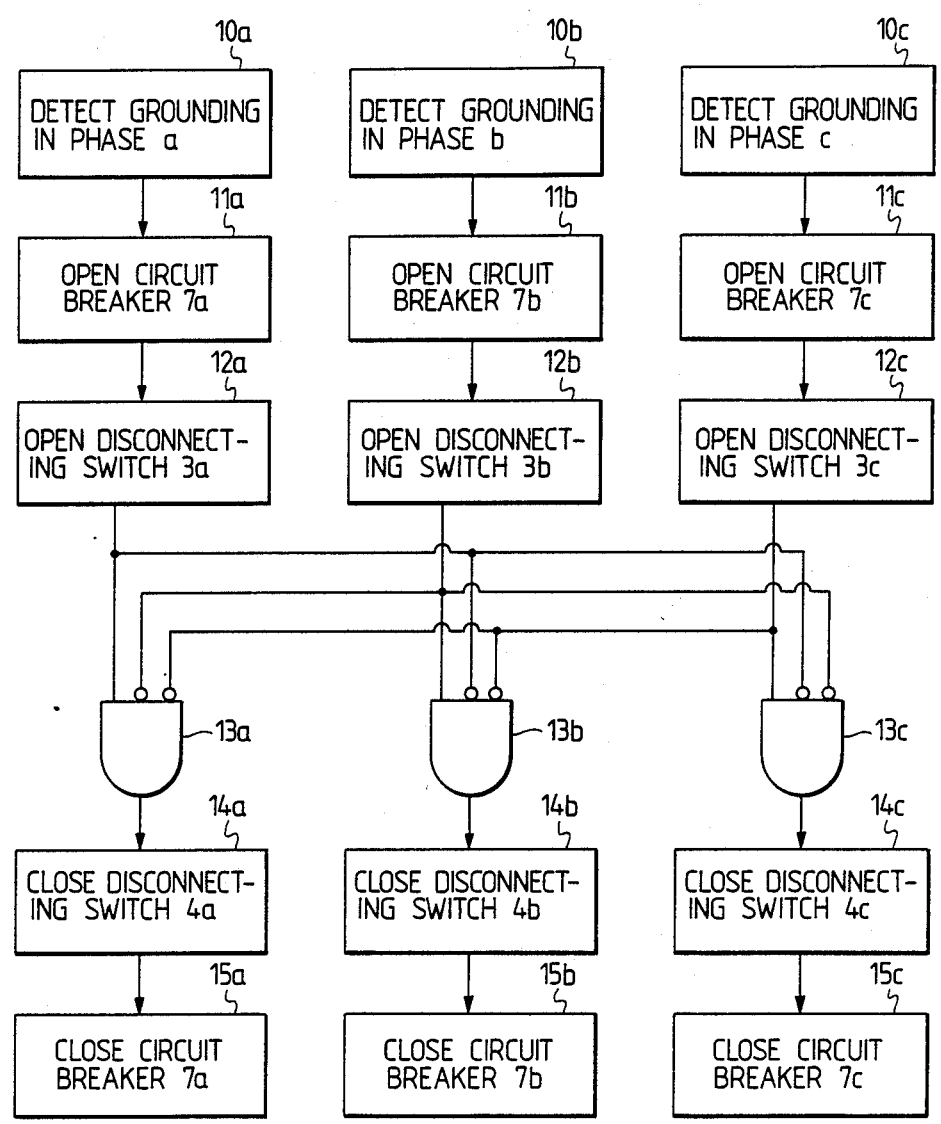
FIG. 2 is a diagrammatic view of the control sequence of the operating device 100 in FIG. 1.

FIG. 2 shows a diagrammatic view of the control sequence of the operating device 100 when one of the three phase main buses 2a, 2b, 2c is grounded and the operating device 100 controls the two sets of the gas insulated switchgear equipment 101, 102 in the same way.

In usual operation, the all of the grounding devices 51a, 52a, 53a, 51b, 52b, 53b, 51c, 52c, 53c are opened, all of the disconnecting switches 3a, 8a, 3b, 8b, 3c, 8c are closed, all of the disconnecting switches 4a, 4b, 4c are opened, and all of the circuit breakers 7a, 7b, 7c are closed.

When the current transformer 6a detects a grounding current in the three phase main buses 2a (step 10a in FIG. 2) for example, the circuit breakers 7a is opened (step 11a in FIG. 2), and the disconnecting switch 3a is opened (step 12a in FIG. 2). Then, a NAND circuit 13a in FIG. 2 allows starting of the step 14a which closes the disconnecting switch 4a and then allows starting of step 15a which closes the circuit breaker 7a. But if grounding in the three phase main bus 2b or 2c is detected at the same time when grounding in the main bus 2a is detected, the step 12b or 12c inhibits starting of the step 14a by a function of the NAND circuit 13a. In the same way, the step 12a inhibits starting of the steps 14b and 14c by functions of NAND circuits 13b and 13c. And, plural of the steps 14a, 14b, 14c do not start and only one of the steps 14a, 14b, 14c starts at same time in order to prevent to form a short circuit by way of the reserve bus 1 between three phase buses connected to cable heads 9a, 9b, 9c. Therefore, no matter what the three phase main buses the reserve bus 1 is connected to through the disconnecting switch 4a, 4b, 4c, the single phase reserve bus 1 is safely connected to only one of the cable heads 9a, 9b, 9c through the disconnecting switch 8a, 8b or 8c and the circuit breaker 7a, 7b or 7c without forming the short circuit of three phase electric power from the cable heads 9a, 9b, 9c.

Further, in the examination of the three phase main buses 2a, 2b, 2c the gas insulated switchgear equipment in the present invention can be operated in the same way as above, but without grounding. That is to say, after the steps from 11a, 11b, 11c to 15a, 15b, 15c without step 10a, 10b, 10c in FIG. 2 are executed, any one of the three phase main buses 2a, 2b, 2c can be examined.

Figure 3:
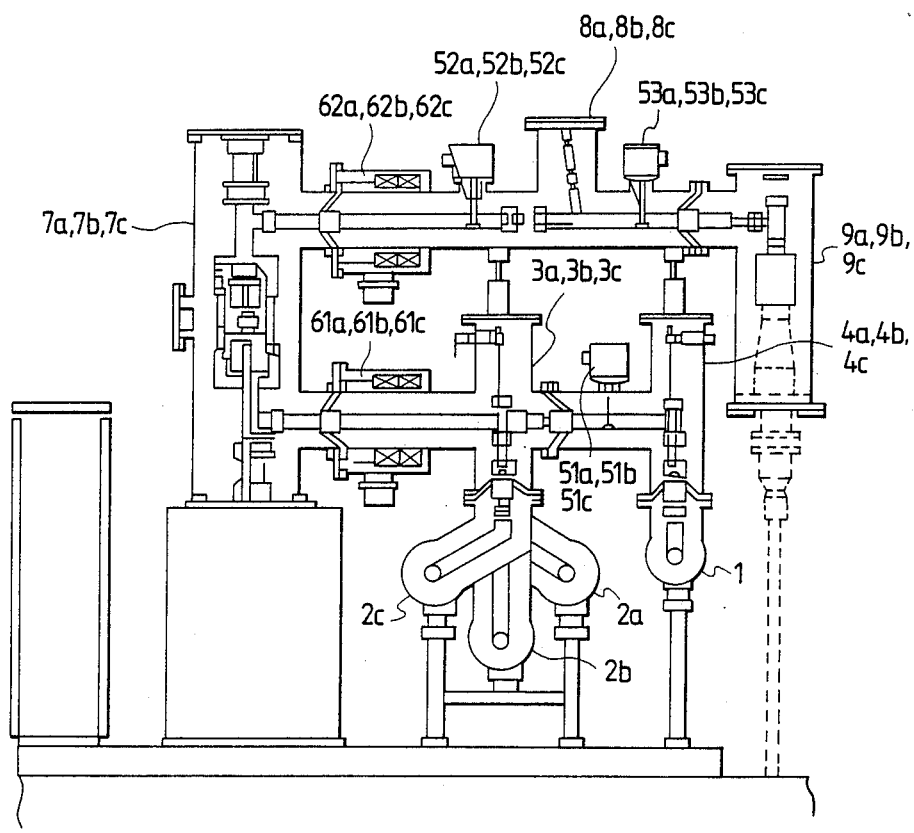
FIG. 3 is a diagrammatic cross-sectional view of the gas insulated switchgear equipment shown in FIG. 1.

FIG. 3 shows a diagrammatic cross-sectional view of the gas insulated switchgear equipment shown in FIG. 1. Elements added same numerals in FIG. 3 with those in FIG. 1 is equal to those added the same numerals in FIG. 1.

We claim:

1. A gas insulated switchgear system having
    two gas insulated switchgear equipments, each of which consists of first disconnecting switches, circuit breakers which is respectively connected between the first disconnecting switches and cable heads in every three phases, and second disconnecting switches which are connected to the first disconnecting switches,
    three phase gas insulated buses which are respectively connected to the first disconnecting switches of the two gas insulated switchgear equipments in every three phases thereof,
    a single phase reserve buses which are commonly connected to all of the second disconnecting switches of the two gas insulated switchgear equipments, and
    an operating device for opening the circuit breakers and the first disconnecting switches in only one phase of the gas insulated switchgear equipments and closing the second disconnecting switch in only the one phase.

2. A gas insulated switchgear system as defined in claim 1, further characterized by
    said operating device for opening the circuit breakers when grounding in one of the three phase gas insulated buses is detected by a current transformer.

3. A gas insulated switchgear system as defined in claim 1, further characterized by
    said operating device for opening the circuit breakers in order to examine one of the three phase gas insulated buses in the one phase.

4. A gas insulated switchgear system as defined in claim 1, further characterized by
    said operating device inhibiting to close the second disconnecting switches in other phase which is different with the one phase.

5. A gas insulated switchgear system having three phase gas insulated buses, circuit breakers, and first disconnecting switches and current transformers which are connected to the three phase gas insulated buses in every phases thereof, comprising
    a single phase reserve bus,
    second disconnecting switches which are connected between the single phase reserve bus and each of the three phase gas insulated buses, and
    operating devices for each opening one of the circuit breakers and one of the first disconnecting switches respectively connected to one of the three phase gas insulated buses and each closing one of the second disconnecting switch connected to said one of the three phase gas insulated buses when said one of the three phase gas insulated buses is grounded.

* * * * *